June 21, 1960 G. B. STONE 2,941,299
SURFACE GAUGE
Filed April 9, 1958 2 Sheets-Sheet 1
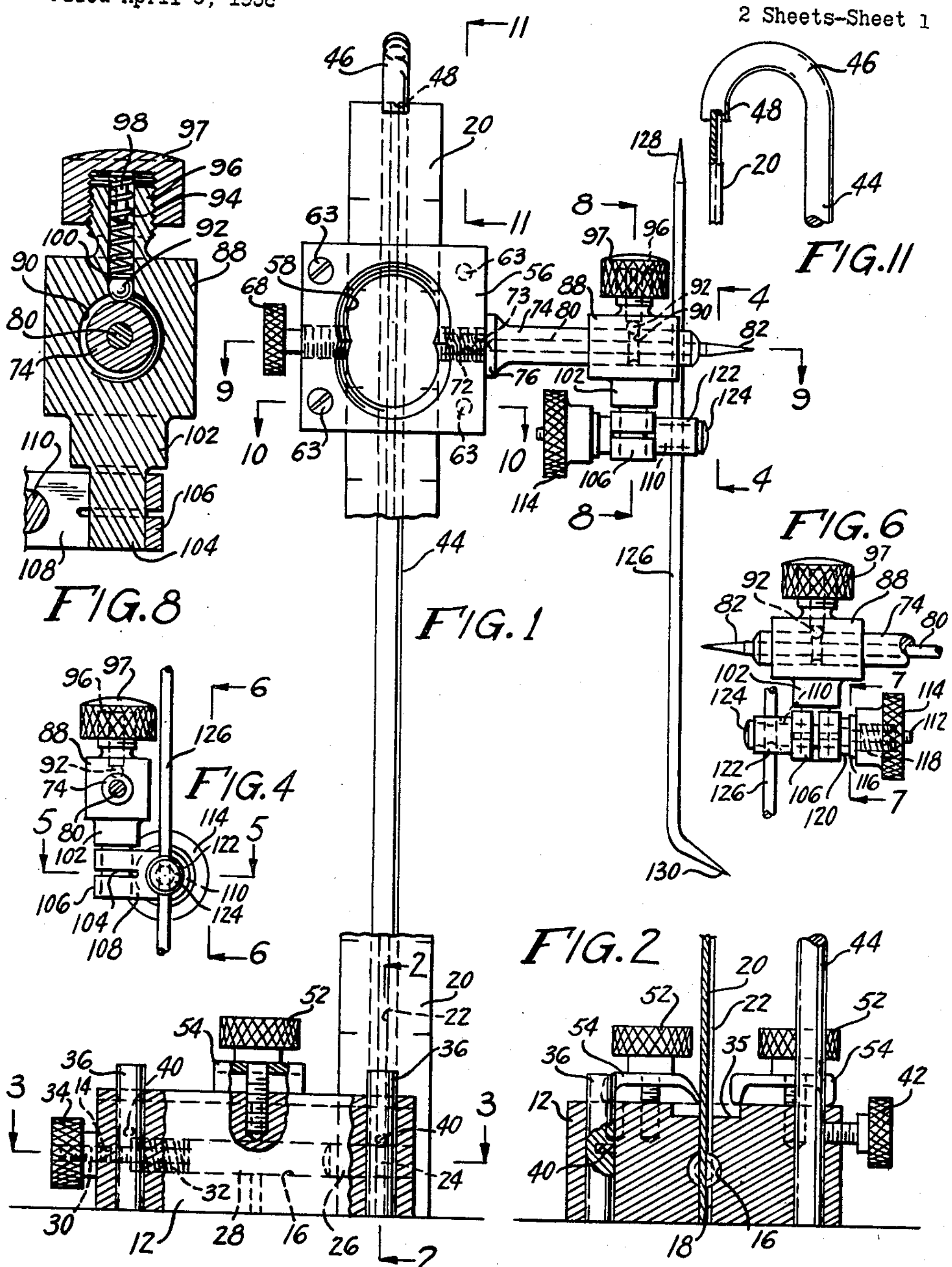
INVENTOR
GUY B. STONE
BY Gustave Miller
ATTORNEY June 21, 1960 G. B. STONE 2,941,299
SURFACE GAUGE
Filed April 9, 1958
2 Sheets-Sheet 2
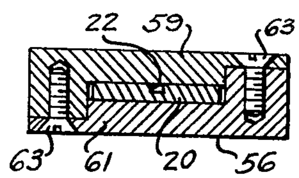
FIG. 10
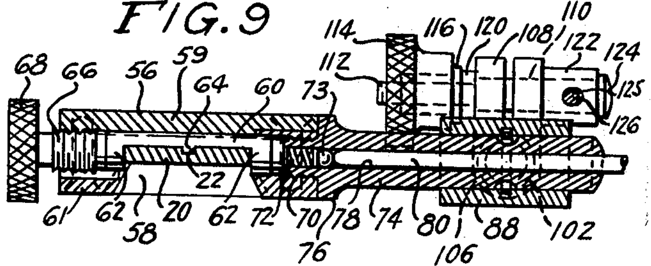
FIG. 9
FIG. 12
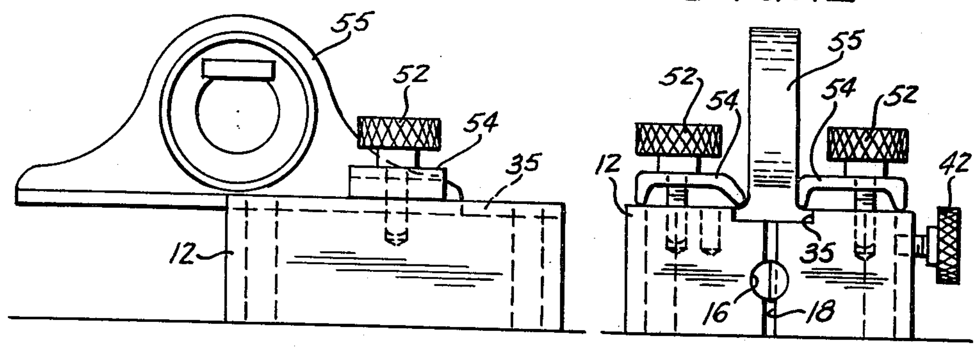
FIG. 13
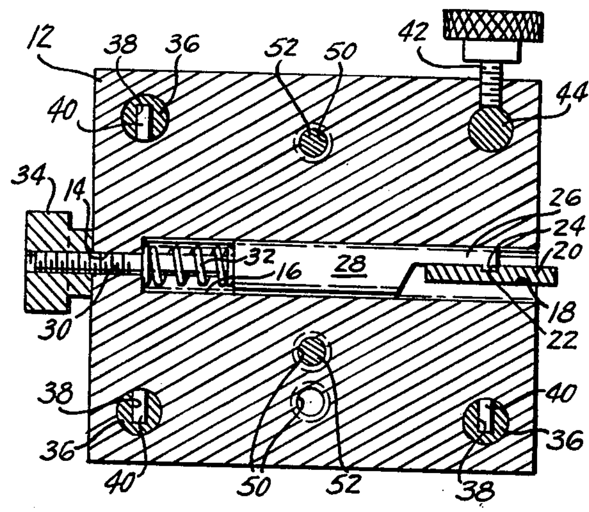
FIG. 3
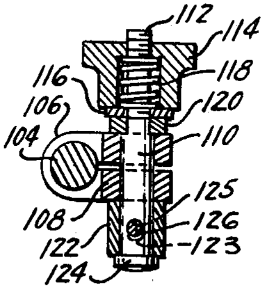
FIG. 7
FIG. 5
INVENTOR
GUY B. STONE
BY Gustave Miller
ATTORNEY

United States Patent Office 2,941,299

Patented June 21, 1960

1

2,941,299

SURFACE GAUGE

Guy B. Stone, 10324 Mallison Ave., South Gate, Calif.

Filed Apr. 9, 1958, Ser. No. 727,325

2 Claims. (Cl. 33—169)

This invention relates to a surface gauge, and it more particularly relates to a gauge adapted to be used on most type surfaces.

One object of the present invention is to permit the user of the tool to draw horizontal, vertical, angular and circular sections and to make any divisions within the range of 360° whether they be star, hexagon, diamond, square or round shaped.

Another object of the present invention is to provide a gauge device which can set up work on a machine with extreme accuracy even though the work be irregular and uneven.

Other objects of the present invention are to provide an improved gauge device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view, partly broken away, of a device embodying the present invention.

Fig. 2 is a sectional view taken on line 2—2 of Fig. 1.

Fig. 3 is a sectional view taken on line 3—3 of Fig. 1.

Fig. 4 is a view taken on line 4—4 of Fig. 1.

Fig. 5 is a view taken on line 5—5 of Fig. 4.

Fig. 6 is a view taken on line 6—6 of Fig. 4.

Fig. 7 is a view taken on line 7—7 of Fig. 6.

Fig. 8 is a view taken on line 8—8 of Fig. 1.

Fig. 9 is a view taken on line 9—9 of Fig. 1.

Fig. 10 is a view taken on line 10—10 of Fig. 1.

Fig. 11 is a view taken on line 11—11 of Fig. 1.

Fig. 12 is a sectional view, similar to Fig. 2, but showing a protractor in place of the scale.

Fig. 13 is a side elevational view of the assembly shown in Fig. 12.

Referring now in greater detail to the drawings wherein similar reference characters refer to similar parts, there is shown a gauge device, generally designated 10, which comprises a base 12 having a narrow bore 14 extending from one edge of the base 12 and a counterbore 16 extending from the inner end of bore 14 toward the other end of the base. At the other end of the base, the counterbore 16 is intersected by a vertical slot 18 in which is positioned the lower end of an elongated, flat, linear scale 20. The scale 20 is provided with a longitudinal groove 22 which receives a key portion 24 on the reduced end 26 of a cylindrical rod 28 having a narrow stem 30 on its opposite end. The rod 28 is positioned in counterbore 16 and the stem 30 extends through bore 14. A coil spring 32 surrounds the stem 30 in counterbore 16 between the end of rod 28 and the shoulder formed between bore 16 and bore 14. The spring 32 urges rod 28 forwardly, whereby the key portion 24 is held engaged in groove 22. The stem 30 is threaded and is held in position by a nut 34. A longitudinal channel 35 is provided on top of the base 12 intersecting the

2 slot 18 and extending from one edge to the other of the base 12.

Adjacent each corner of the base 12 is a vertical bore through which is adapted to extend a pin 36. These pins are each provided with transverse slots 38 to receive a resilient plug 40 for frictionally holding the pin in place. One of these corner bores is provided with a transverse, threaded bore through which is adapted to extend a set-screw 42. In this vertical bore, the pin 36 may be replaced by the lower end of a rod 44, the upper end of which is bent around, as at 46, and has a notch at its end, as at 48. This notch 48 supportingly receives the upper end of the scale 20. The set-screw 42 holds rod 44 secure in the base 12. The pins 36 may be adjusted individually to mate the base 12 square with any type of surface.

Along the median line of the base 12 are provided three screw-threaded holes 50 to receive the thumb-screws 52 which act to hold clamps 54 in place. These clamps 54 are adapted to secure a protractor 55 to the base when the scale 20 is removed. As illustrated in Fig. 3, two holes 50 are provided at one side of the channel 35 in order to secure one of the clamps 54 in adjustable position relative to the channel 35. The protractor 55 is shown secured in place in Figs. 12 and 13.

Slidably positioned on scale 20 is a block 56 having an opening 58 on one side through which the indicia on the scale may be read. The block 56 is provided with a central slot formed by securing two oppositely stepped sections 59 and 61 by means of countersunk screws 63 (as best seen in Fig. 10). The block 56 is slidable on the scale 20 by means of fitting the scale 20 within the central slot of the block 56.

In order to adjustably secure the block 56 on the scale 20 there is provided a transverse bore in the block (as best seen in Figs. 1 and 9) and in this transverse bore, which intersects the opening 58 in the block, is provided a bar 60 having a key 64 centrally thereof which fits within the groove 22 of the scale 20. The bar 60 has a flange 62 at each end to engage the edges of the scale 20. At one side of the bar 60, the transverse bore is threaded to receive the threaded stem 66 of a thumb screw 68.

At the other end of the bar 60, within the transverse bore, is threadedly engaged a hollow, externally-threaded stem 70. The threaded stem 66 of thumb screw 68 is hollow and within it is positioned a light coil spring and spring follower (not shown). This hidden spring bears against the adjacent flange 62 of bar 60. In somewhat the same manner, stem 70, on the opposite end of bar 60, is provided internally with a coil spring 72 bearing against its adjacent flange 62. At its other end, spring 72 bears against a ball 73 within the hollow stem 70 (as best seen in Fig. 9). For adjustment of the block 56 on scale 20, the screw 68 is loosened and the block 56 is slid to the desired position with the key 64 and groove 22 acting as guide means. When in position, the screw 68 is tightened, which holds bar 60 tightly against stem 70.

Integral with stem 70 is an elongated holder 74 having a widened base portion 76 equipped with a flat bearing surface which is held flush against the adjacent edge of block 56 (as best seen in Figs. 1 and 9). The holder 74 is provided with a longitudinal, internal bore 78 which extends through the holder 74 from one end to the other and meets with the hollow interior of stem 70 at the inner end of the holder 74. Within the bore 78 is frictionally engaged the stem 80 of a scriber 82; the internal end of stem 80 bearing against ball 73 within hollow stem 70.

The holder 74 also acts to support a second scriber assembly (as best shown in Fig. 8). This second scriber assembly comprises a sleeve 88 of square external shape and having an internal bore of circular cross-sectional shape. Within this internal bore is fitted the holder 74 which acts as an internal support for the sleeve 88. Within this sleeve, holder 72 is provided with an external peripheral groove 90 into which a ball 92 is resiliently urged by a coil spring 94. The spring 94 is positioned in a central bore of an upstanding sleeve 96 integral with sleeve 88. The spring 94 extends upwardly from the sleeve 96 to bear against the internal upper surface of a cup-shaped, internally-threaded cap-screw 97 threaded on the externally-threaded sleeve 96. The spring 94 also extends downwardly into a recess 100 in the sleeve 88 itself, this recess 100 mating with the bore of sleeve 96. By turning the cap-screw 97 in one direction, the ball 92 is pressed tightly into the peripheral groove 90 to lock the sleeve 88 on holder 74. By turning the cap-screw 97 in the other direction, the connection is loosened and sleeve 88 may be removed from holder 74 or rotatably adjusted thereon.

The sleeve 88 is provided with a depending boss 102 having an integral reduced portion 104. Around this reduced portion 104 is clamped a split collar 106 having a lateral extension 108 in which is clamped a shaft 110 provided with a reduced portion 112 having external threads thereon. A sleeve-type nut 114 is threaded on shaft portion 112 and bears against a washer 116. Within the sleeve-like nut 114 is positioned a coil spring 118 which bears at one end against the top internal surface of nut 114 and at its other end against washer 116. On the opposite side of washer 116 is a washer 120 which bears against split collar extension 108. At the other side of collar extension 108, the shaft 110 is surrounded by a sleeve 122 having oppositely positioned openings 123 adapted to mate with a transverse bore 125 in the shaft 110. The sleeve 122 is loose on the shaft 110 and is held against end-wise movement by a cap 124 on the shaft end. Adapted to extend through openings 123 in the sleeve 122 and bore 125 in shaft 110 is the stem of a scriber 126. The scriber 126 has a straight end 128 adapted to be used on horizontal surfaces and an offset end 130 for use on vertical surfaces.

The split collar 106 is clamped on portion 104 in rotatably adjusted position by screwing down the nut 114. This not only acts to tighten the collar 106 around portion 104 but also acts to tighten the sleeve against cap 124, thereby moving openings 123 slightly out of line with bore 125 and thereby clamping the scriber 126 tightly in place.

In operation, with the scale 20 held in position between the base 12 and bent portion 46 of rod 44, the block 56 can be vertically adjusted on the scale to any desired measured height, after which the block is locked in place by tightening screw 68. The point of scriber 82, frictionally held in the bore of holder 74, can then be used to inscribe the work. For further marking of a workpiece, the scriber 126 is rotatably adjustable by means of screw 114 and is also longitudinally adjustable, being slidable through the bore 125 in shaft 110 and being frictionally held therein after adjustment. The scale readings on scale 20 can be viewed through the aperture 58 of the block 56 to indicate the adjustment of the block on the scale.

By removing the scale 20 and inserting bevel protractor 55 in the channel 35 of base 12 and holding the protractor in place by means of clamps 54 and screws 52, it is possible to trace any angular line within 360°.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A guage device comprising a base, means in said base for releasably holding the lower end of an elongated scale, an elongated scale held on said base by said means and extending vertically upward, a vertical rod extending upwardly from said base substantially parallel to said scale, said vertical rod having securing means at its upper end to releasably support the upper end of said scale, a block slidably adjustable on said scale, a scriber holder extending laterally from said block, a bracket rotatably adjustable on said holder, a rotatable shaft held by said bracket in offset relation to said holder, and a scriber extending transversely through said shaft, said scriber comprising an elongated rod having one straight pointed end and one offset pointed end, wherein said vertical rod is releasably held in said base at its lower end and has an offset, curved portion at its upper end, said curved portion having a slot on its end, and the upper end of said scale being received in said slot.

2. A guage device comprising a base, means in said base for releasably holding the lower end of an elongated scale, an elongated scale held on said base by said means and extending vertically upward, a vertical rod extending upwardly from said base substantially parallel to said scale, said vertical rod having securing means at its upper end to releasably support the upper end of said scale, a block slidably adjustable on said scale, a scriber holder extending laterally from said block, a bracket rotatably adjustable on said holder, a rotatable shaft held by said bracket in offset relation to said holder, and a scriber extending transversely through said shaft, said scriber comprising an elongated rod having one straight pointed end and one offset pointed end, wherein said bracket comprises a sleeve rotatably embracing said holder, a bore in said sleeve to receive said holder, a transverse opening extending from one edge of said sleeve and intersecting said bore, a peripheral groove on said holder, a ball positioned in said transverse opening and held in said peripheral groove by a spring, said spring being positioned around a spring follower within an externally-threaded hollow stem extending from said sleeve, a cap-screw threaded on said stem, the opening in said hollow stem mating with said transverse opening.

References Cited in the file of this patent

UNITED STATES PATENTS

| | | |
|---|---|---|
| 618,133 | Roberts | Jan. 24, 1899 |
| 1,023,242 | Childs | Apr. 16, 1912 |
| 1,163,512 | Cubiac | Dec. 7, 1915 |
| 1,245,130 | Somers | Oct. 30, 1917 |
| 1,902,270 | Tate | Mar. 21, 1933 |
| 2,515,716 | Kikly | July 18, 1950 |
| 2,519,942 | Tedrick | Aug. 22, 1950 |